United States Patent
Malevants et al.

(10) Patent No.: US 7,089,624 B2
(45) Date of Patent: Aug. 15, 2006

(54) CLEANER FOR FIBER OPTIC CONNECTORS

(75) Inventors: Vyacheslav Malevants, Vernon Hills, IL (US); Igor Grois, Northbrook, IL (US)

(73) Assignee: Molex Incorporated, Lisle, IL (US)

( * ) Notice: Subject to any disclaimer, the term of this patent is extended or adjusted under 35 U.S.C. 154(b) by 301 days.

(21) Appl. No.: 10/094,998

(22) Filed: Mar. 11, 2002

(65) Prior Publication Data

US 2003/0169991 A1 Sep. 11, 2003

(51) Int. Cl.
A47L 5/14 (2006.01)
(52) U.S. Cl. ............. 15/345; 15/381; 15/310; 15/97.1; 134/6; 134/21
(58) Field of Classification Search ........... 15/97.1, 15/21.1, 101, 56, 59, 300.1, 345, 381, 310, 15/210.1; 134/6, 8, 21
See application file for complete search history.

(56) References Cited

U.S. PATENT DOCUMENTS

| | | | |
|---|---|---|---|
| 5,342,549 A | | 8/1994 | Michael |
| 5,557,696 A | | 9/1996 | Stein |
| 5,836,031 A | * | 11/1998 | Cox .................... 15/104.002 |
| 5,906,686 A | | 5/1999 | McNeil .................. 134/1 |
| 5,925,191 A | * | 7/1999 | Stein et al. ............. 134/6 |
| 6,006,768 A | * | 12/1999 | Cox ..................... 134/200 |
| 6,047,716 A | | 4/2000 | Shimoji et al. ......... 134/166 |
| 6,053,985 A | * | 4/2000 | Cheswick et al. ....... 134/6 |
| 6,110,013 A | * | 8/2000 | Minami et al. ......... 451/41 |
| 6,125,227 A | | 9/2000 | Cox ..................... 385/134 |
| 6,209,163 B1 | * | 4/2001 | Clairadin et al. ....... 15/97.1 |
| 6,769,150 B1 | * | 8/2004 | Liu et al. ............... 15/21.1 |
| 2002/0006261 A1 | | 1/2002 | Barkus et al. |
| 2002/0108636 A1 | * | 8/2002 | Childers et al. ........ 134/6 |
| 2002/0195123 A1 | * | 12/2002 | Strait .................. 134/8 |

FOREIGN PATENT DOCUMENTS

| | | |
|---|---|---|
| EP | 0391111 | 10/1990 |
| EP | 0391111 A1 | 10/1990 |
| EP | 0900630 A2 | 3/1999 |
| JP | 54004150 | 1/1979 |
| JP | 60256103 | 12/1985 |
| JP | 62108213 | 5/1987 |
| JP | 92108213 | 5/1987 |
| JP | 02254406 | 10/1990 |
| JP | 10078533 | 3/1998 |
| JP | 2001038308 | 2/2001 |
| WO | WO 9840769 A2 | 9/1998 |

OTHER PUBLICATIONS

International Search Report for International Application No. PCT/US03/07175.

* cited by examiner

Primary Examiner—Alexander Markoff
(74) Attorney, Agent, or Firm—Romi Bose (57) ABSTRACT

A cleaner is provided for cleaning the end surface area of a ferrule of a fiber optic connector. The cleaner includes a housing having a mating portion for mating the cleaner with the connector. A cleaning head is movably mounted on the housing for movement across the end surface area. A motor is mounted on the housing and is coupled to the cleaning head for moving the cleaning head in response to operation of the motor. An air jet is mounted on the housing for directing a stream of a cleaning medium toward the cleaning head to remove residue from the end surface area. An exhaust is provided on the housing for removing and evacuating residue from the end surface area. A plurality of the cleaners are mounted on a dummy circuit board for cleaning the end surface areas of the ferrules of a plurality of fiber optic connectors mounted in a given pattern on a backplane of a chassis.

14 Claims, 8 Drawing Sheets

CLEANER FOR FIBER OPTIC CONNECTORS

FIELD OF THE INVENTION

This invention generally relates to the art of fiber optic connectors and, particularly, to a cleaner and a system for cleaning a fiber optic connector such as cleaning the end surface area of the ferrule of the connector. The connector may be mounted on a backplane of a chassis adapted for receiving a printed circuit board.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and positions an optical fiber or fibers within the connector. The ferrule may be fabricated of such material as ceramic or glass filled resin. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

Such fiber optic connectors typically are connected end-to-end. In other words, two opposite ends surfaces of opposing ferrules are mated to directly connect opposing end surfaces of the optical fibers to each other. The connectors should provide excellent connection characteristics. However, major problems are encountered if the ferrule end surfaces become contaminated by dust, oil or other contaminants which will cause the connection characteristics to become markedly deteriorated.

In order to solve the contamination problems, cleaners have been provided to clean the ferrule end surfaces of fiber optic connectors. The cleaners typically include some form of soft cloth or paper which is moved over the ferrule end surfaces. The cloth or paper may be dampened with a cleaning solution such as ethanol. Fluorocarbon gas has been used in a separate step to remove excessive ethanol and any cloth or paper dust.

While cleaners of the character described above have proven effective for their intended purposes, they have limitations in that the fiber optic connectors typically are "brought to" the cleaner or there is easy access of the cleaner to the connectors. In other words, the connectors are easily moved to positions in engagement with the cleaner. Such cleaners are extremely difficult to use and, often, are not effective where there is limited access to the connectors, such as where the connectors are located in a remote or confined area. Still further, it is difficult, if not impossible, to use most existing cleaners on the ferrule end surfaces of connectors which are mounted in adapter assemblies. The connectors must be removed from the adapters in order to be cleaned. This problem equally exists when a ferrule end surface is located inwardly or recessed within a mating end face of a connector. In order to solve this myriad of interrelated problems, an improved cleaner and cleaning system was developed as shown in U.S. Pat. Nos. 6,209,162 and 6,209,163 which issued on Apr. 3, 2001, and which are assigned to the assignee of the present invention. The invention herein is directed to further improvements in such cleaners and cleaning systems.

SUMMARY OF THE INVENTION

An object, therefore, of the invention is to provide a new and improved cleaner and system for cleaning the end surface area of a ferrule of a fiber optic connector.

In the exemplary embodiment of the invention, the cleaner includes a housing having a mating portion for mating the cleaner with the fiber optic connector. A cleaning head is movably mounted on the housing for movement across the end surface area of the ferrule. A motor is mounted on the housing, and motion transmitting means are coupled between the motor and the cleaning head for moving the cleaning head in response to operation of the motor.

According to one aspect of the invention, the cleaning head is mounted for oscillatory or back-and-forth movement relative to the end surface area. The motor is a rotary motor, and the motion transmitting means include conversion means for converting rotary motion from the motor to oscillatory motion of the cleaning head. As disclosed herein, the conversion means include an eccentric member rotatably connected to the motor and engageable within an elongated trough on a transition member pivotally mounted on the housing. The cleaning head is fixed to a forward side of the transmission member, and the eccentric member engages within the trough at a rear side of the transition member.

According to another aspect of the invention, an air jet is mounted on the housing for directing a stream of gas toward the cleaning head at the end surface area to remove residue therefrom. As disclosed herein, a plurality of cleaning heads are provided with each cleaning head including an individual air jet. The cleaning heads are mounted at the forward side of the transition member which comprises a common manifold for the plurality of air jets. The manifold is connected to a single inlet passage for receiving gas under pressure from an appropriate source thereof.

According to a further aspect of the invention, the interior of the housing is at least partially hollow and in communication with the end surface area to be cleaned. Exhaust means are provided on the housing for evacuating the interior thereof to remove residue from the end surface area.

Other features of the invention include the provision of a removably mounted cleaninghead covered with cleaning pad. The mating portion of the housing comprises a separate and independent component removably and interchangeably mounted on the housing for accommodating a given configuration of the fiber optic connector. The mating portion includes a receptacle for receiving the fiber optic connector. The air jets direct a gas and liquid mixture wherein the gas is air and the liquid is a solution of deionized water, isopropyl alcohol and dipropylene glycol monometyl ether.

Finally, the cleaner is used in a system for cleaning the end surface areas of a plurality of ferrules of a plurality of fiber optic connectors mounted in a given pattern on a backplane of a chassis adapted for receiving a printed circuit board having a complementary pattern of mating connectors mateable with the fiber optic connectors. A dummy circuit board is provided and is receivable by the chassis. A plurality of cleaners are mounted on the dummy circuit board in the given pattern for cleaning the end surface areas of the ferrules of the fiber optic connectors when the dummy circuit board is received by the chassis. Each cleaner includes at least one cleaning head and the self-contained motor for operating the cleaning head. Each cleaner also may include the air jets and the exhaust means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Referring to the drawings in greater detail, and first to FIGS. 1–4, a cleaner, generally designated 10, is provided for cleaning the end surface area of a ferrule of a fiber optic connector as will be described herein in relation to FIGS. 3–7. The cleaner includes a housing, generally designated 12 in FIG. 1. The housing is a three-part structure as seen best in FIG. 2, including a base 14, a cover 16 and a mating portion 18. The cover is held onto the base by a plurality of screw-type fasteners 20 inserted through holes 22 in the cover and threadingly fastened into bosses 24 within the base. Mating portion 18 is press-fit onto two pairs of mounting posts 26 projecting forwardly of base 14. The base and cover 16 form a generally hollow interior 28 of the housing. An inlet tube 30 and an exhaust tube 32 project rearwardly of base 14 and communicate with the hollow interior 28 thereof.

Four removable cleaning heads 34 are disposed forwardly of base 14 and, when the cleaner is assembled, the cleaning heads are disposed within mating portion 18. As seen best in FIGS. 3 and 4, the cleaning heads are covered with cleaning pads 36. The four cleaning heads 34 are formed by forwardly projecting fingers of a pair of plates 38. The plates, in turn, are inserted into slitted forward ends of four air jets 40. The air jets project through a pair of enlarged holes 42 in base 14 so that the air jets and, in turn, cleaning heads 34 can move relative to base 14 and mating portion 18 (i.e., housing 12). Jets 40 are called "air" jets in a generic sense only, because the jets do not necessarily direct air, alone, to the cleaning heads as will be explained hereinafter. The "air jets" are capable of directing any gas or gas/liquid mixture to the cleaning heads.

Figure 1:
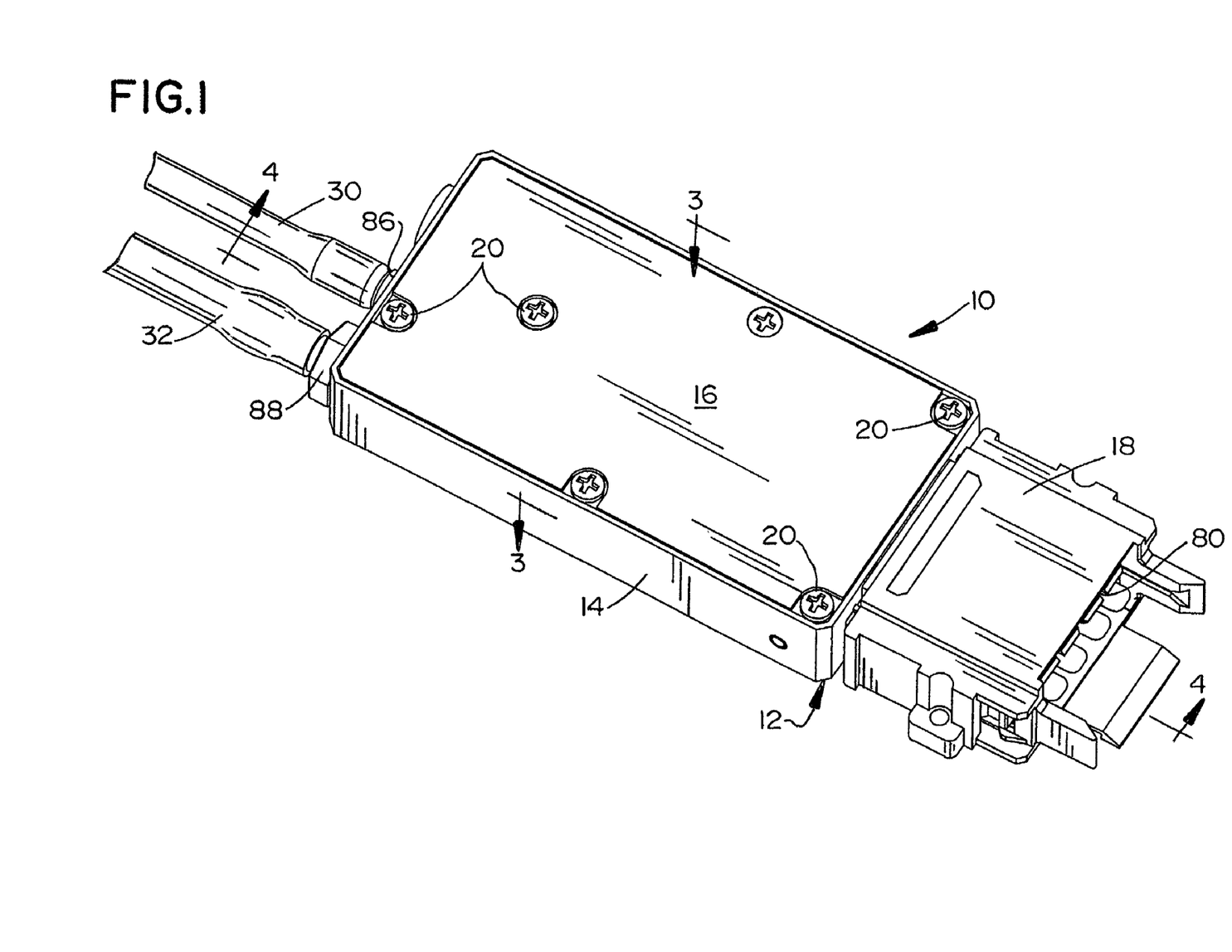
FIG. 1 is a perspective view of a cleaner for a fiber optic connector, according to the invention.
Figure 2:
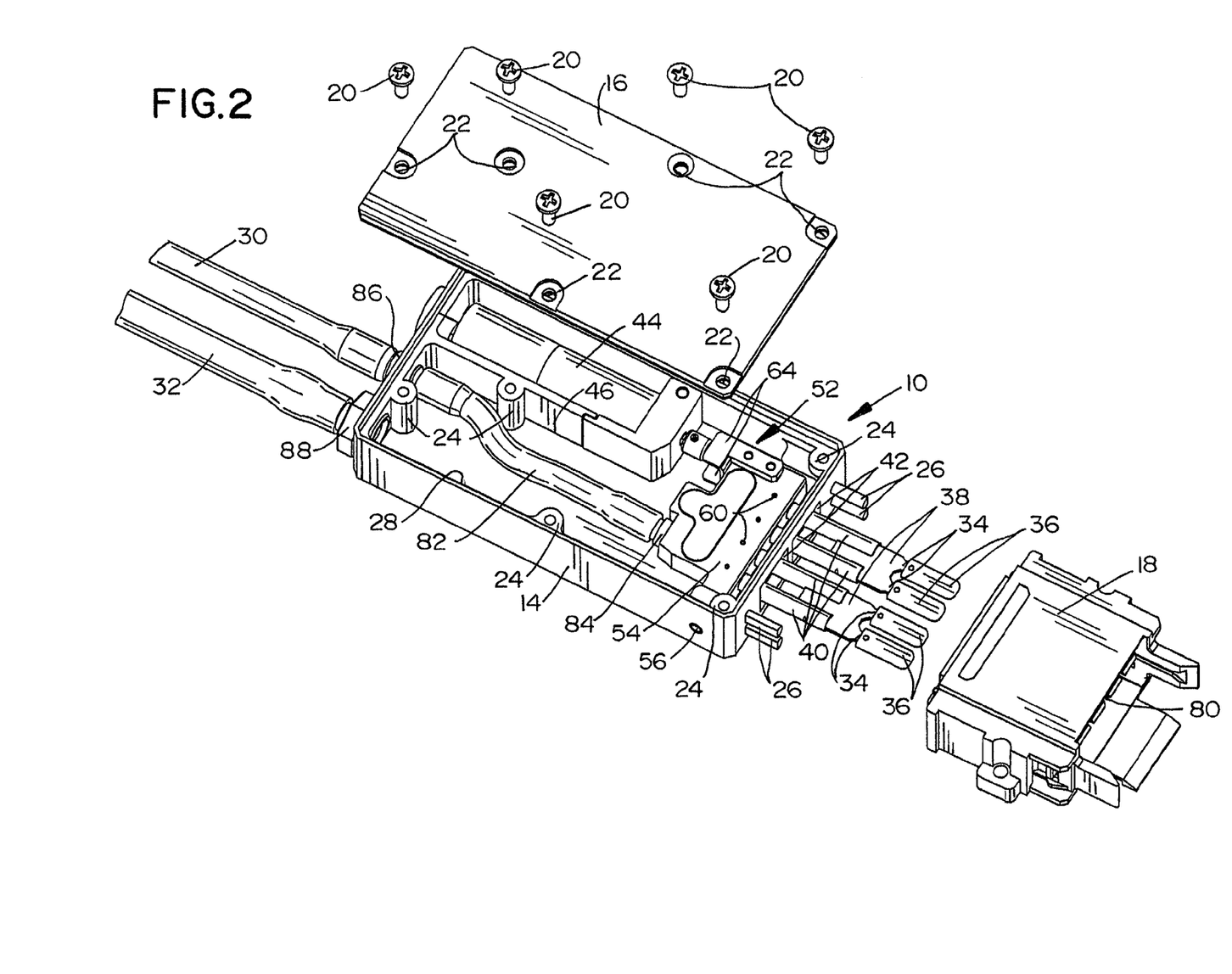
FIG. 2 is a perspective view of the cleaner of FIG. 1, with the cover and mating portion separated therefrom.
Figure 3:
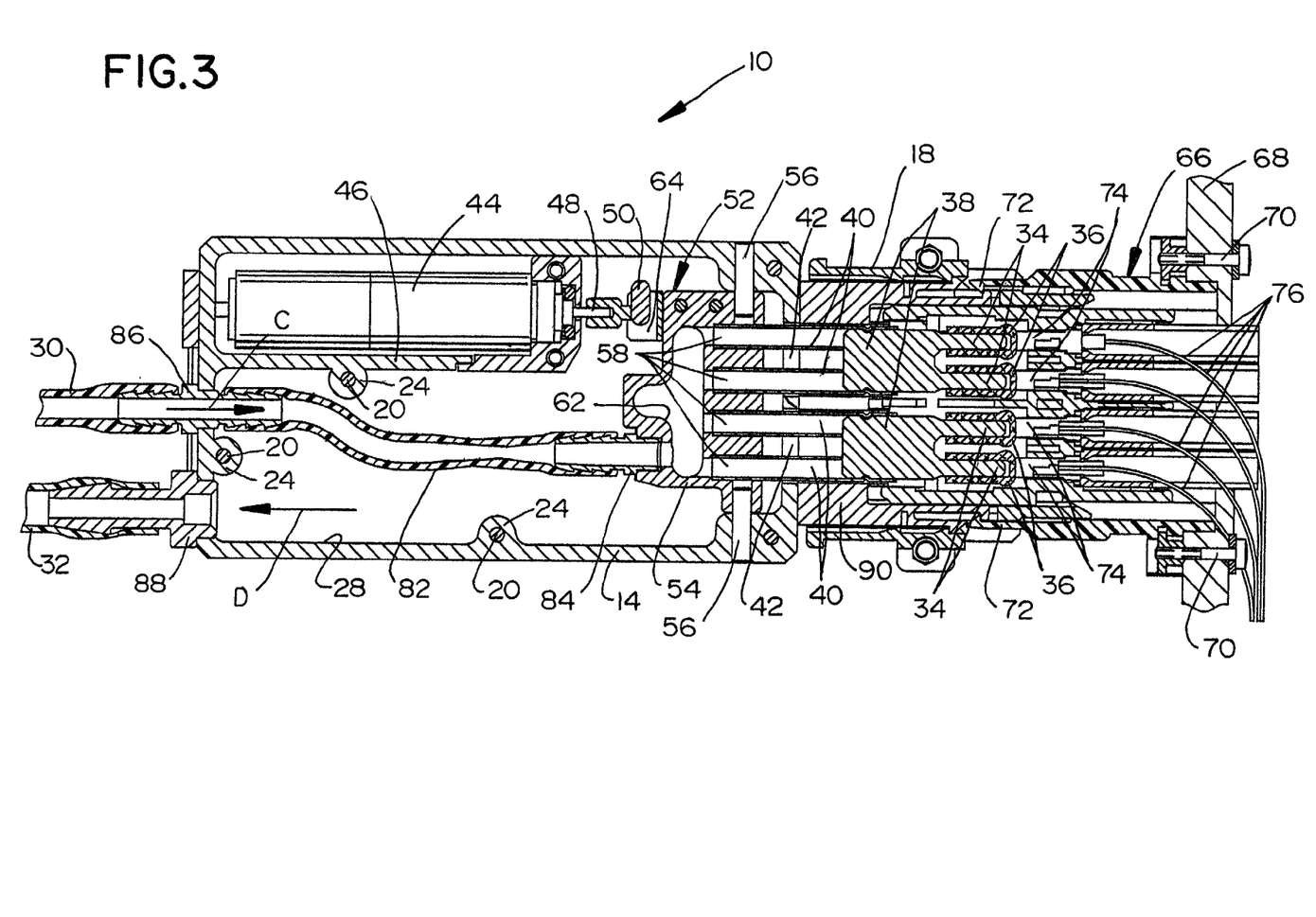
FIG. 3 is a horizontal section taken generally along line 3—3 of FIG. 1, with the cleaner mated with a fiber optic connector.

As best seen in FIGS. 2 and 3, a motor 44 is mounted within a compartment 46 within hollow interior 28 of base 14. The motor is a rotary motor and includes a rotatable drive shaft 48 projecting out of the front of compartment 46 as best seen in FIG. 3. An eccentric member 50 is fixed to the front end of rotating drive shaft 48.

Generally, motion transmitting means, generally designated 52, are coupled between motor 44 and cleaning heads 34 through air jets 40, for moving the cleaning heads in response to operation of the motor. More particularly, a transition member 54 is pivotally mounted to base 14 by a pair of pivot pins 56 as best seen in FIG. 3. The four air jets 40 are fixed within four passages 58 (FIG. 3) of transition member 54 by set screws 60 (FIG. 2). The passages communicate with a hollow interior 62 of transition member 54 whereby the transition member comprises a manifold, for purposes described hereinafter. Rotating eccentric member 50 of motor 40 is disposed within a horizontally or transversely elongated trough defined by a pair of flanges 64 at the rear of transition member or manifold 54.

Figure 4:
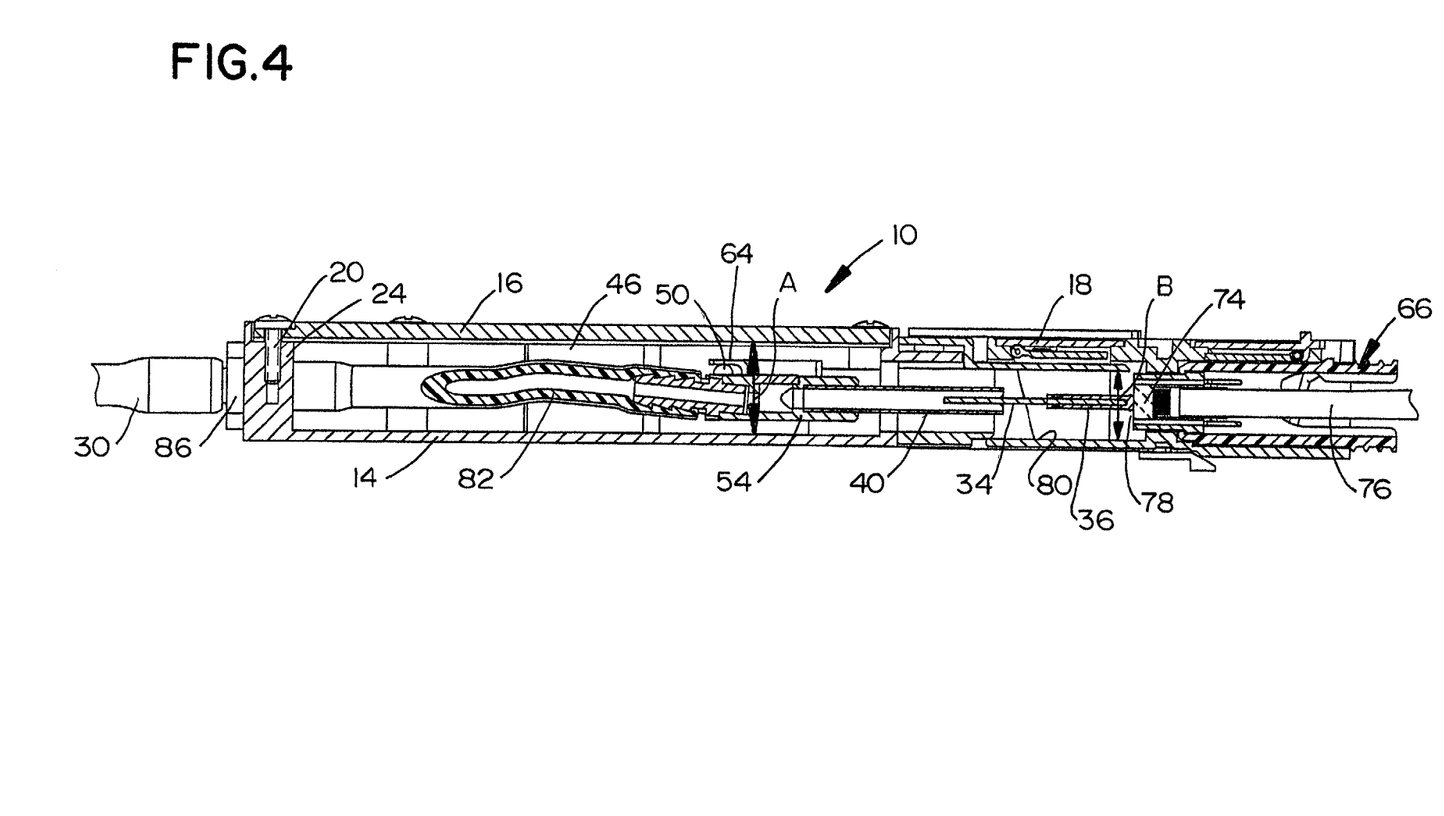
FIG. 4 is a vertical section taken generally along line 4—4 of FIG. 1, with the cleaner mated with a fiber optic connector.

In essence, rotating eccentric member 50 disposed within the horizontally elongated trough defined by flanges 64, forms a conversion means in conjunction with pivotally mounted manifold 54 for converting rotary motion from motor 44 to vertically oscillatory motion of cleaning heads 34. When the eccentric member rotates within the trough defined by flanges 64, the rear side of manifold 54 vertically oscillates in the direction of double-headed arrow "A" (FIG. 4). As the manifold reciprocally pivots about pivots pins 56 (FIG. 3), the front side of the manifold, along with air jets 40 and cleaning heads 34, vertically oscillate in the direction of double-headed arrow "B" (FIG. 4) across the end surfaces areas of a plurality of ferrules of a fiber optic connector described below.

FIGS. 3 and 4 show cleaner 10 mated with a fiber optic connector, generally designated 66, fixed to a backplane 68 by a pair of fasteners 70. The connector includes a pair of latch arms 72 (FIG. 3) for latching into engagement with mating portion 18 of the cleaner. The fiber optic connector mounts four ferrules 74 which are terminated to four fiber optic cables 76 which, typically, contain a plurality of optical fibers. FIG. 4 shows one of the cleaning pads 36 on the end of one of the cleaning heads 34 in engagement with an end surface area 78 of one of the ferrules 74 of fiber optic connector 66. The transmitting ends of the optical fibers typically are flush with this end surface area of the ferrules. When motor 44 oscillates cleaning head 34 and cleaning pad 36 in the direction of double-headed arrow "B" in FIG. 4, the cleaning head and pad are effectively moved across and clean end surface area 78. Of course, as seen in FIG. 3, all of the cleaning heads and pads simultaneously clean the end surface areas of all of the ferrules of connector 36.

At this point, it also should be understood that mating portion 18 is intentionally removably mounted on base 14 of the cleaner so that a plurality of different mating portions can be interchangeable to accommodate different configurations of fiber optic connectors. In the embodiment herein, mating portion 18 includes a receptacle 80 for receiving fiber optic connector 66. However, other configurations of mating portions are contemplated.

According to another aspect of the invention, inlet tube 30 is pneumatically coupled to manifold 54 by a short supply tube 82 within the hollow interior 28 of the housing. The supply tube is in communication with interior 62 of the manifold by a fitting 84 (FIG. 3). The supply tube is in communication with inlet tube 30 through a fitting 86 extending through the rear wall of base 14. A cleaning gas or a mixture of gas and liquid is supplied through inlet tube 30 and into supply tube 82 in the direction of arrow "C" (FIG. 3). The cleaning medium or "air" is directed into hollow interior 62 of the manifold and through passages 58 in the manifold into air jets 40. Plates 38 are thin and flat and are inserted into the hollow tube-like air jets, whereby air from the air jets moves over the top and bottom surfaces of plates 38 toward and around cleaning heads 34 and cleaning pads 36. The air, thereby, is directed toward and against end surface areas 78 (FIG. 4) of ferrules 74 to remove residue therefrom which is removed by cleaning pads 36.

Exhaust tube 32 is in communication with hollow interior 28 of the housing through a fitting 88 mounted through the rear wall of base 14. The cleaning medium which is directed by air jets 40 against end surface areas 78 returns to hollow interior 28 of the housing through enlarged holes 42 through the front wall of base 14. The medium passes above and below manifold 54 into hollow interior 28 and out of exhaust tube 32 in the direction of arrow "D" (FIG. 3). To that end, it can be seen in FIG. 3 that mating portion 18 has an inner body 90 which seals against the front face of base 14 so that the cleaning medium returns back into hollow interior 28 of the housing from which it is exhausted.

Figure 5:
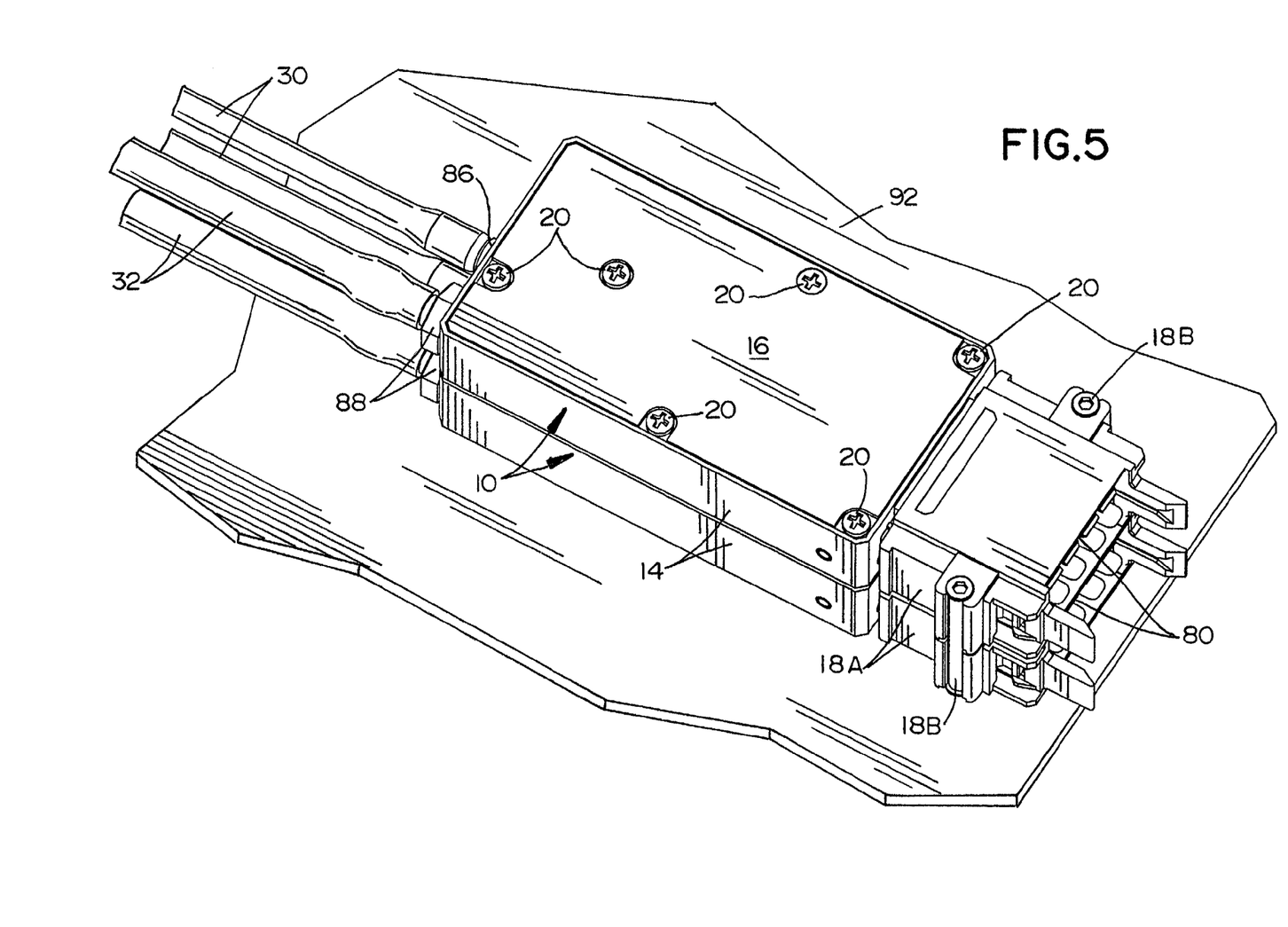
FIG. 5 is a perspective view of a pair of the cleaners mounted in a stacked array on a dummy printed circuit board.

FIG. 5 shows a pair of cleaners 10 mounted on a dummy printed circuit board 92 in a stacked array. This is accomplished simply by providing mating portions 18A configured for stacking cleaners one on top of another, and fasteners 18B for mounting stacked cleaners on the dummy circuit board 92. Of course, more than two cleaners can be stacked in this fashion. Such an arrangement accommodates the stacking of a plurality of fiber optic connectors on a backplane, for instance.

Figure 6:
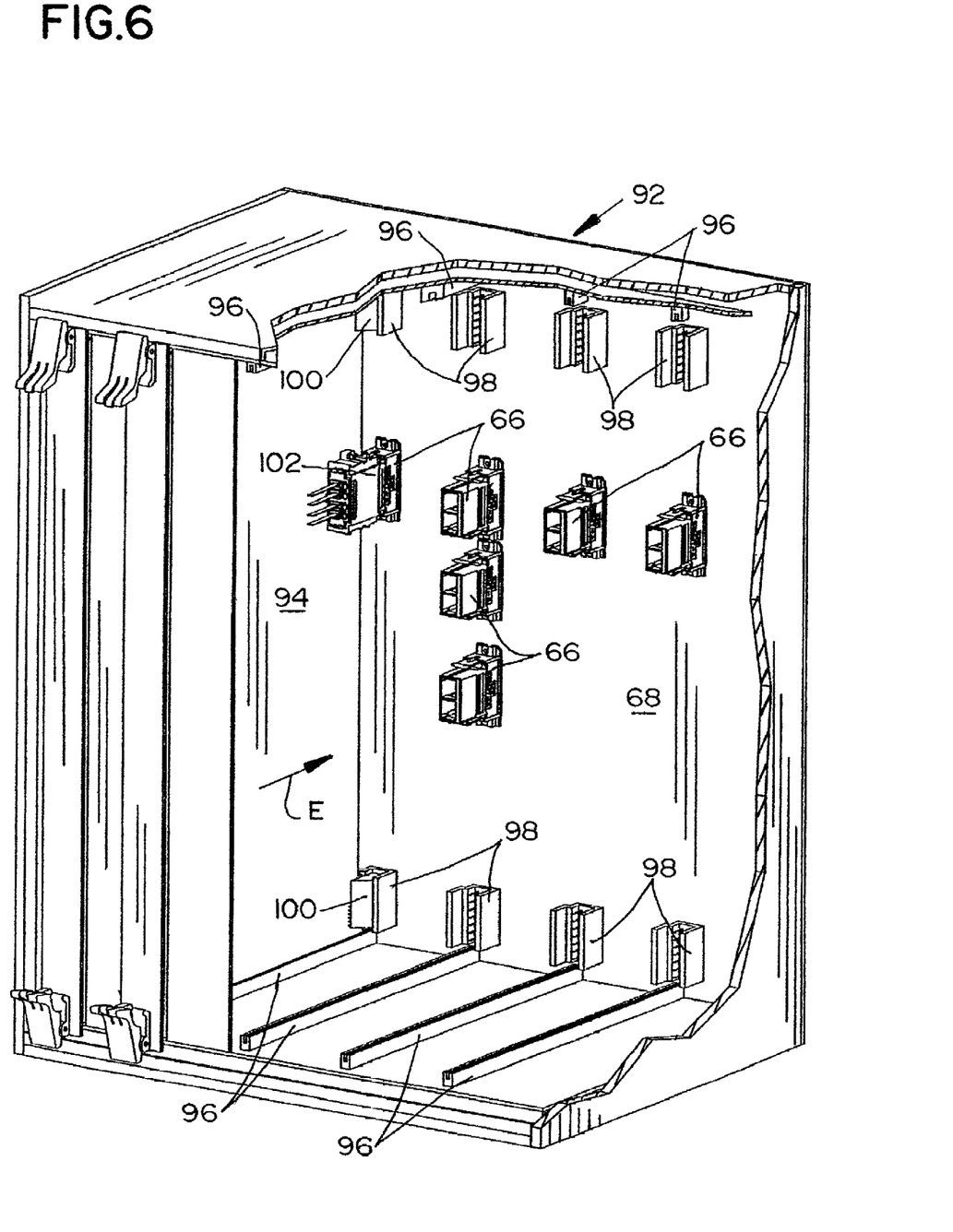
FIG. 6 is a fragmented perspective view of a backplane chassis system within which the cleaner and cleaner system of the invention has considerable utility.
Figure 7:
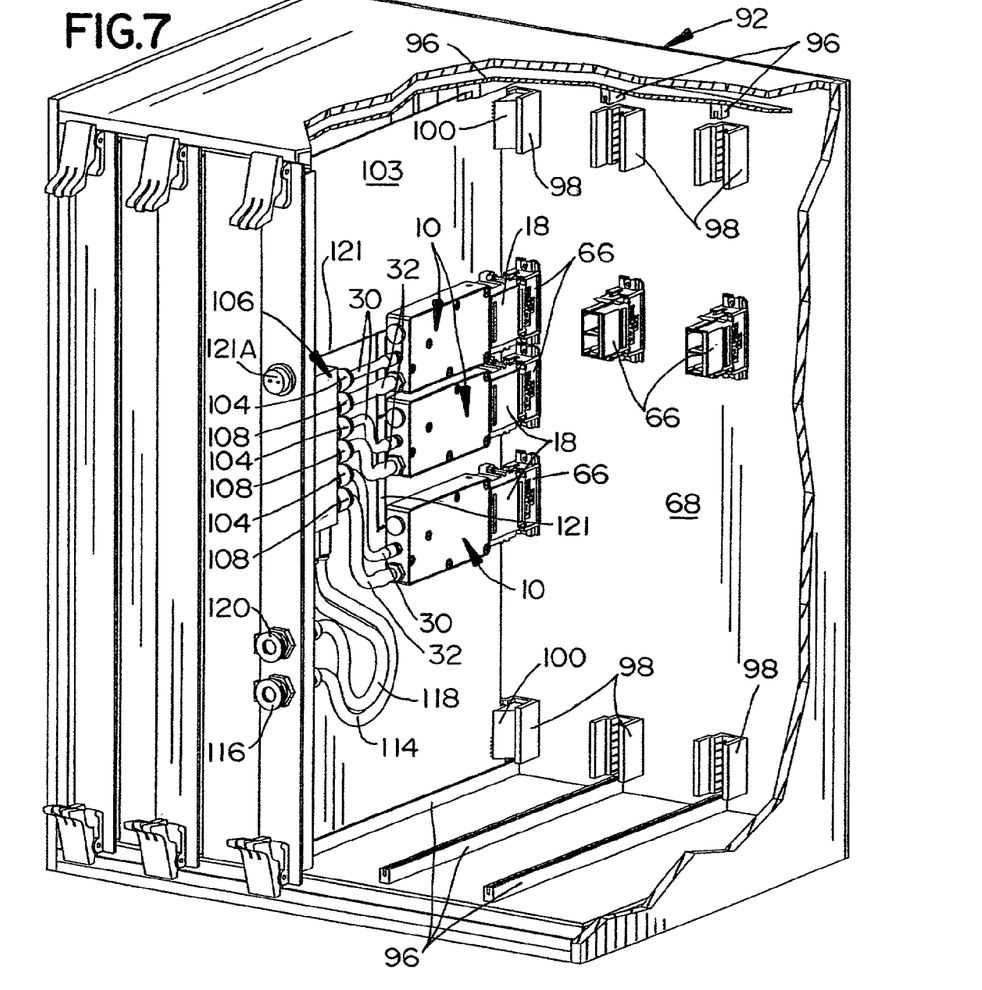
FIG. 7 is a fragmented perspective view similar to that of FIG. 6, with a dummy circuit board mounting three cleaners according to the invention inserted into a pattern of three connectors on the backplane of the chassis.
Figure 8:
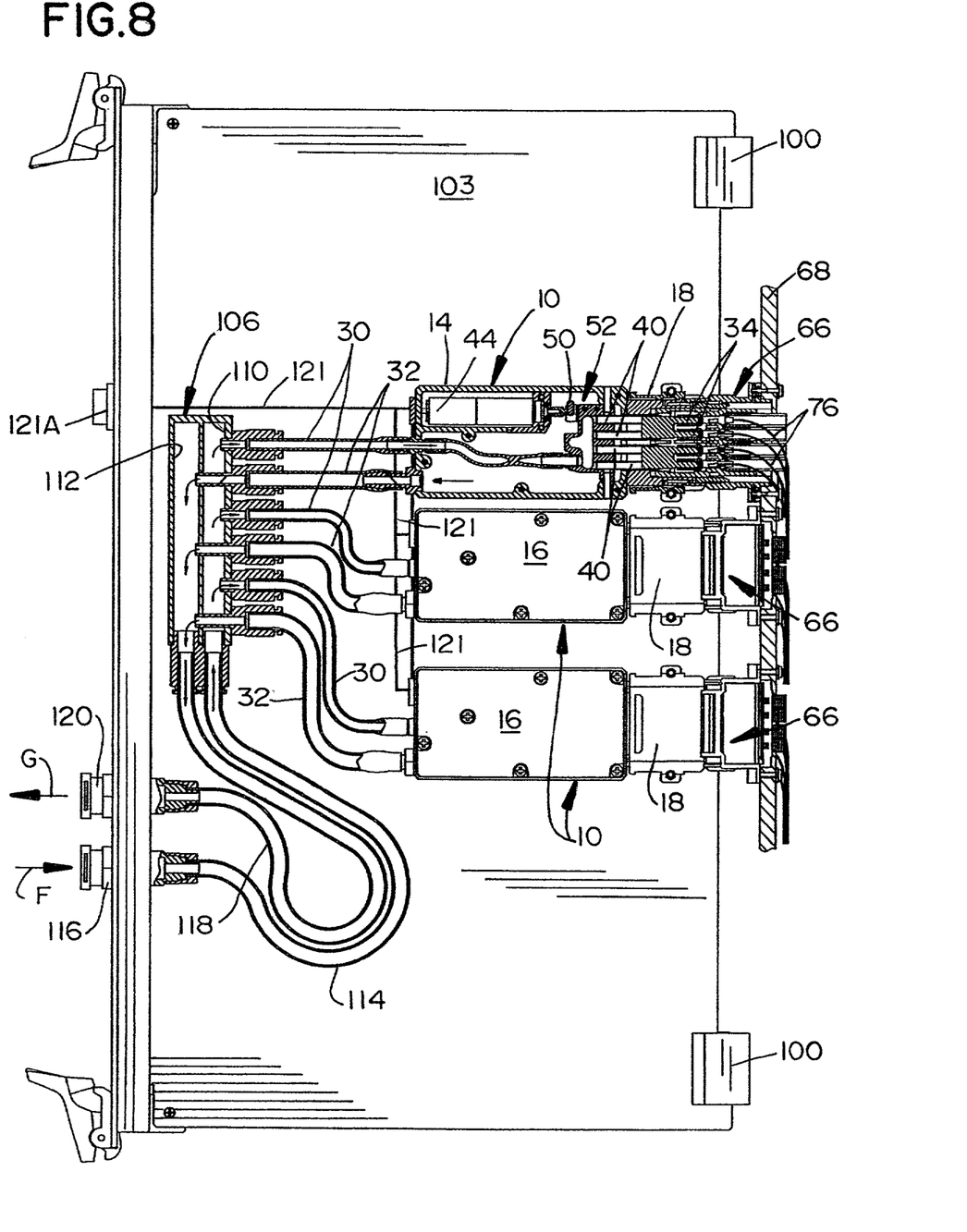
FIG. 8 is a side elevational view of the cleaners and dummy circuit board shown in FIG. 7.

FIGS. 6–8 show a system for cleaning the end surface areas of a plurality of ferrules of a plurality of fiber optic connectors mounted on backplane 68 of a card frame or backplane chassis, generally designated 92, adapted for receiving a plurality of printed circuit boards 94. Referring first to FIG. 6, card frame or backplane chassis 92 includes a plurality of guide rails 96 for receiving the top and bottom edges of printed circuit boards 94. A plurality of edge-card connectors 98 are mounted on backplane 68 in alignment with guide rails 96. Header connectors 100 are mounted at the leading edge of printed circuit boards 94 for connection within edge card connectors 98. Alternatively, the edge card connectors could be configured to directly engage circuit traces along the leading edges of the printed circuit boards. A plurality of fiber optic connectors 66 (FIGS. 3 and 4) are mounted at different locations on backplane 68 generally in alignment with guide rails 96 and edge card connectors 98 (i.e., in alignment with the leading edges of printed circuit boards 94). The printed circuit boards have connectors 102 mounted thereon for mating with fiber optic connectors 66. The printed circuit boards are inserted into chassis 92 in the direction of arrow "E". From the foregoing, it can be understood that fiber optic connectors 66 may be mounted on backplane 98 in different arrays or patterns, including more than one connector for each printed circuit board. For instance, it can be seen generally in the middle of backplane 68 that three fiber optic connectors 66 are arranged in a vertical pattern.

It should be understood that the card frame or backplane chassis described above in relation to FIG. 6 is but one application within which the cleaning system of the invention is applicable. In other words, backplane 68 is a "motherboard" and printed circuit boards 94 are "daughterboards" in the card frame or chassis of FIG. 6. However, the cleaning system of the invention is equally applicable wherein printed circuit boards are used within connectors simply mounted on panels or frame components other than a motherboard. Therefore, the use of the term "backplane" herein and in the claims hereof is not limited to the backplane being a printed circuit board.

With that understanding, reference is made to FIGS. 7 and 8 wherein it can be seen that a pattern of three cleaners 10 (FIGS. 1–4) are mounted on a dummy circuit board 103. The cleaners are arranged in a given pattern on the dummy circuit board whereby the mating portions 18 of the cleaners mate with the pattern of fiber optic connectors 66 on backplane 68. Inlet tubes 30 from cleaners 10 are connected by fittings 104 to a common manifold, generally designated 106. Exhaust tubes 32 from cleaners 10 are connected by fittings 108 to the common manifold. As best seen in FIG. 8, common manifold 106 is divided into a supply side or compartment 110 and an exhaust side or compartment 112. Therefore, all of the inlet tubes 30 of all of the cleaners are in communication with supply side 110 of common manifold 106, and the supply side is connected by a supply conduit 114 to a main supply coupling 118. Similarly, all of the exhaust tubes 32 from all of the cleaners 10 are in communication with exhaust side 112 of common manifold 106 which is connected by an exhaust conduit 118 to a main exhaust coupling 120. Main supply coupling 116 can be coupled to an appropriate source of a cleaning medium for receiving the medium from the source in the direction of arrow "F" (FIG. 8). Main exhaust coupling 120 can be connected to an appropriate source of vacuum for exhausting exhaust side 112 of common manifold 116 in the direction of arrow "G". From the foregoing, it can be seen that the assembly of FIGS. 7 and 8 is effective to supply a cleaning medium to twelve air jets 40 through a single supply conduit 14 and exhausting the interiors of all of the cleaners to a single exhaust conduit 118. Of course, still additional cleaners and additional air jets can be accommodated by the single supply and exhaust conduits. All of the motors 44 of cleaners 10 are connected by electrical wiring 121 to a common electrical plug 121A which can be appropriately connected to a source of electricity.

Figure 9:
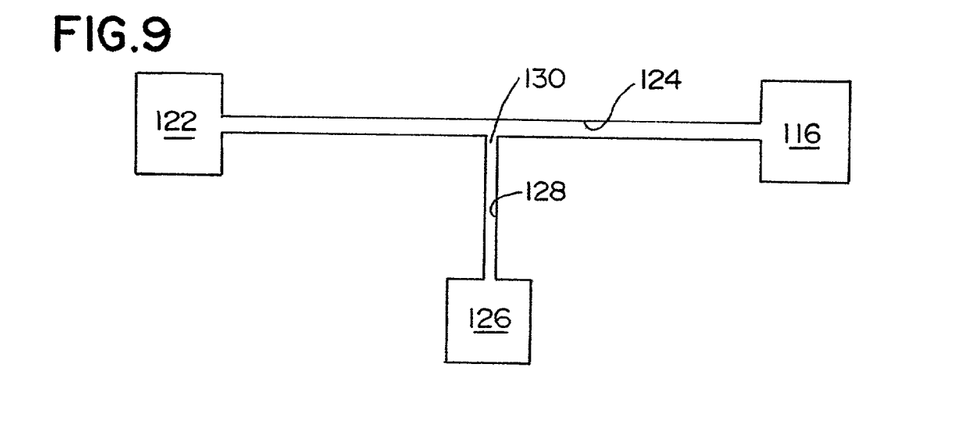
FIG. 9 is a somewhat schematic view showing the mixing of the air/liquid mixture which is fed to the air jets of the cleaners.

Finally, FIG. 9 shows a simple schematic diagram of an appropriate source for a nonionic cleaning medium to be supplied to main supply coupling 116 connected to supply conduit 114 (FIGS. 7 and 8). In particular, a gas is supplied from a source 122 thereof into a conduit 124 coupled to main supply coupling 116. A source 126 of liquid is coupled by a venturi tube 128 to conduit 124. Venturi tube 128 is smaller than conduit 124, and the gas from source 122 creates a vacuum at point 130 to draw liquid from source 126. This arrangement creates sort of a mist or spray-type cleaning medium directed into the system. The invention contemplates that the gas from source 122 may comprise air and the liquid from source 126 may comprise a solution of water, alcohol and glycol ether, preferably deionized water, isopropyl alcohol and dipropylene glycol monometyl ether. Cleaning pads 36 preferably are fabricated of hydroentangled continuous-filament polyester material which is extremely low in nonvolatile residue. An example of such material are a type of swabs called Micro Absorbond ESD Swabs sold by Texwipe Company LLC.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

The invention claimed is:

1. A cleaner for cleaning the end surface area of a ferrule of a fiber optic connector, comprising:
   a housing having a mating portion for mating a cleaner with a fiber optic connector, wherein the interior of said housing is at least partially hollow and in communication with said end surface area, and including exhaust means on the housing for evacuating the interior thereof to remove residue from said end surface area;
   a cleaning head movably mounted on the housing for movement across said end surface area;
   a motor mounted on the housing; and
   motion transmitting means coupled between the motor and the cleaning head for moving the cleaning head in response to operation of the motor.

2. The cleaner of claim 1 wherein said cleaning head is mounted for oscillatory movement relative to said end surface area, said motor is a rotary motor, and said motion transmitting means include conversion means for converting rotary motion from the motor to oscillatory motion of the cleaning head.

3. The cleaner of claim 2 wherein said conversion means include an eccentric member rotatably connected to the motor and engageable within an elongated trough connected to the cleaning head.

4. The cleaner of claim 2 wherein said conversion means include a transition member pivotally mounted on the housing, said cleaning head being fixed to a forward side of the transition member, and said rotary motor being connected to an eccentric member engage able with a rear side of the transition member.

5. The cleaner of claim 1, including a plurality of said cleaning heads all coupled to the motor by said motion transmitting means for conjoint movement of the cleaning heads in response to operation of the motor.

6. The cleaner of claim 1, wherein said cleaning head is removably mounted and is covered with a cleaning pad.

7. The cleaner of claim 1 wherein said mating portion of the housing comprises a separate and independent component removably mounted on the housing for accommodating a given configuration of the fiber optic connector.

8. The cleaner of claim 7 wherein said mating portion includes a receptacle for receiving the fiber optic connector.

9. The cleaner of claim 1, including an air jet on the housing for directing a stream of a cleaning medium toward said cleaning head at said end surface area to remove residue therefrom.

10. The cleaner of claim 9, including a plurality of said cleaning heads each including an individual air jet, the air jets being connected to a common manifold, and the manifold being connected to an inlet passage for receiving a cleaning medium under pressure from an appropriate source thereof.

11. The cleaner of claim 10 wherein said manifold includes a single inlet communicating with said inlet passage and a plurality of outlets communicating with said plurality of air jets.

12. The cleaner of claim 10 wherein said cleaning heads are attached to said manifold, and the manifold comprises part of said motion transmitting means.

13. The cleaner of claim 12 wherein said cleaning heads are mounted for oscillatory movement relative to the fiber optic connector, said motor is a rotary motor, and said manifold is coupled between the motor and the cleaning heads.

14. The cleaner of claim 13 wherein said manifold is pivotally mounted on the housing, said cleaning heads are fixed to a forward side of the manifold, and said rotary motor is connected to an eccentric member engageable with a rear side of the manifold.

* * * * *